(12) United States Patent
Wisniewski

(10) Patent No.: US 6,446,945 B1
(45) Date of Patent: Sep. 10, 2002

(54) SPRING RECOIL STAMPING FOR BIASING A VEHICLE SEAT BOTTOM

(76) Inventor: David M. Wisniewski, 15762 Claire Ct., Macomb Township, MI (US) 48042

( * ) Notice: Subject to any disclaimer, the term of this patent is extended or adjusted under 35 U.S.C. 154(b) by 56 days.

(21) Appl. No.: 09/696,859

(22) Filed: Oct. 26, 2000

(51) Int. Cl.$^7$ .................................................. F16F 1/00
(52) U.S. Cl. .................. 267/131; 267/105; 297/452.15; 297/452.18
(58) Field of Search ................................. 267/131, 100, 267/103, 105, 160; 297/284.11, 452.48, 452.1, 452.13, 452.15, 452.18, 452.49, 452.54

(56) References Cited

U.S. PATENT DOCUMENTS

| | | |
|---|---|---|
| 3,630,572 A | 12/1971 | Homier |
| 3,897,036 A | 7/1975 | Nystrom |
| 4,191,424 A | 3/1980 | Mundell |
| 4,448,386 A | 5/1984 | Moorhouse et al. |
| 4,583,781 A | 4/1986 | Hatsutta et al. |
| 4,662,597 A | 5/1987 | Uecker et al. |
| 4,709,896 A | 12/1987 | Wahls et al. |
| 4,838,514 A | * 6/1989 | Hill .............................. 248/577 |
| 5,116,016 A | 5/1992 | Nagata |
| 5,395,089 A | 3/1995 | Yamauchi et al. |
| 5,765,803 A | 6/1998 | Graham |
| 5,924,682 A | 7/1999 | Bullard |
| 5,988,748 A | 11/1999 | Morrison et al. |
| 6,010,195 A | 1/2000 | Masters et al. |

* cited by examiner

*Primary Examiner*—Pam Rodriguez
(74) *Attorney, Agent, or Firm*—Gifford, Krass, Groh, Sprinkle, Anderson & Citkowski, P.C.

(57) ABSTRACT

A recoil strap for use with a vehicle seat frame bottom, the frame having an open interior defined by inwardly facing side edges, apertured portions being defined along a first side edge of the frame and clasp portions being defined along a second side edge. The strap includes an elongated and substantially planar shaped body, constructed of a stamped and spring steel blank, and having a first end and a second end. A plurality of catch portions extend from the first end for securing to the aperture portions of the frame bottom and a plurality of eyelet portions extend from the second end for securing to the clasp portions of the frame bottom. The strap is biased in an upward direction, and in response to a downward application of force, by at least one plurality of alternating bends and recesses formed in the stamped blank. The stamped blank may also include an arcuate curvature to provide additional biasing and resistive support to the seat bottom.

9 Claims, 2 Drawing Sheets

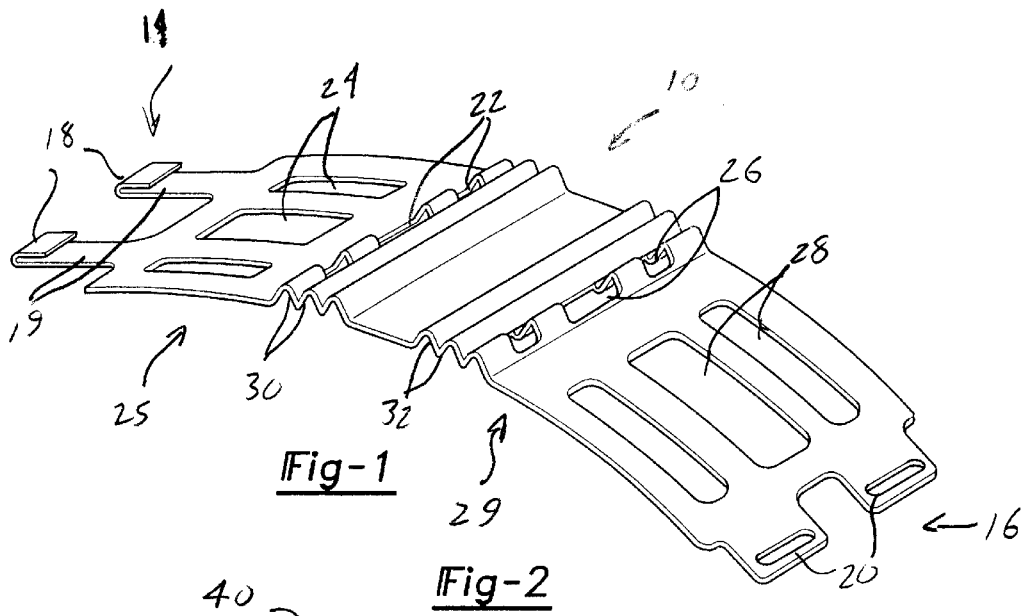
Fig-1
Fig-2
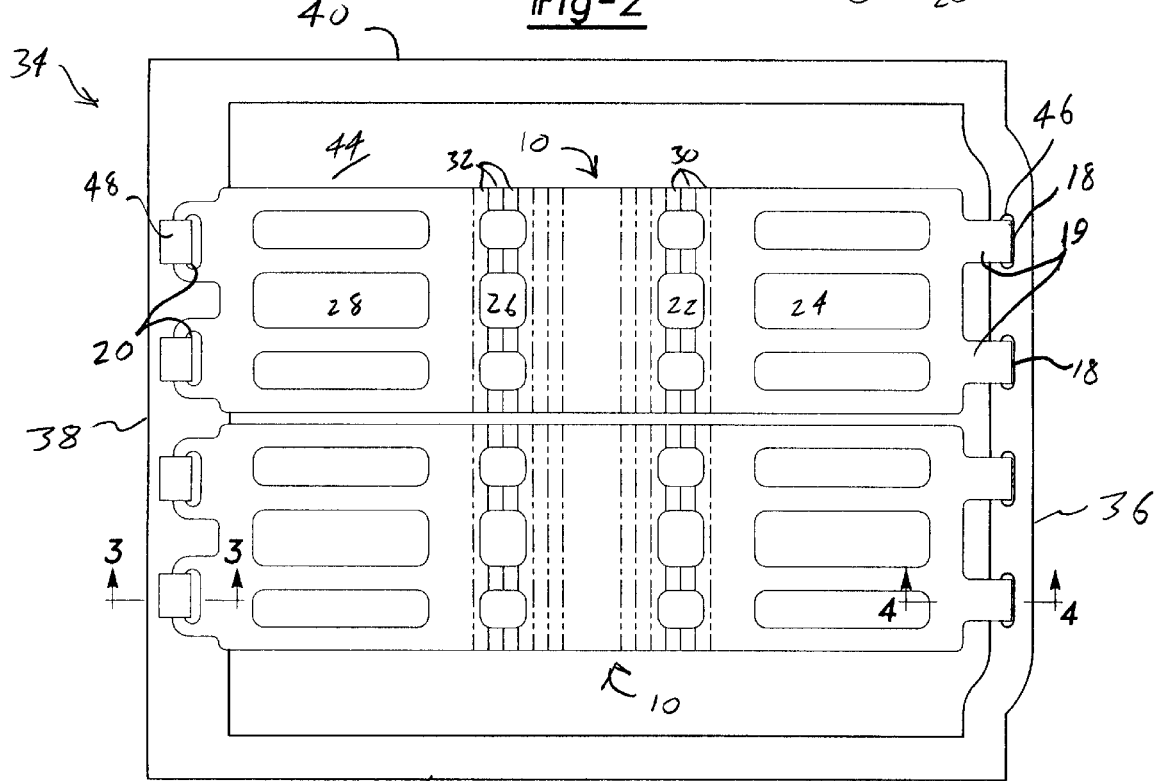
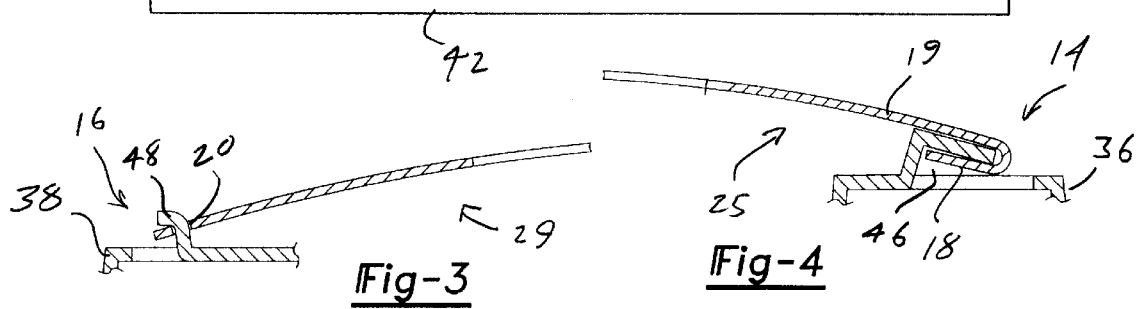
Fig-3
Fig-4

SPRING RECOIL STAMPING FOR BIASING A VEHICLE SEAT BOTTOM

BACKGROUND OF THE INVENTION

1. Field of the Invention

The present invention relates generally to spring biasing and recoil devices, in particular those employed in vehicle seat assemblies. More specifically, the present invention is directed to a spring recoil stamping for biasing a vehicle seat bottom.

2. Description of the Prior Art

The prior art is well documented with examples of seating assemblies, particularly those used in automotive applications for spring biasing a seat bottom and prior to subsequent installation of a seat cushion. One application known in the prior art contemplates providing the vehicle seat frame bottom with an open interior defined by four inwardly facing side edges of the frame bottom. A crosswise interconnecting and extending grid of wires is arrayed over the open interior and is secured in place by a plurality of coil tensioning springs extending from either one or more sides of the grid and which interengage, at selected locations, along the corresponding and inwardly facing side edges of the seat frame.

While effective, the drawbacks of the prior art spring grid arrangement include the relative cost and expense of manufacturing the support grid, as well as the time and effort needed to install each support grid onto a seat bottom. Also, the production of new and larger vehicle seat assemblies (such as are typically used in second and third row bench seats in minivans and sport utility vehicles) have resulted in an attendant increase in the size of a given spring support grid.

U.S. Pat. No. 5,924,682, issued to Bullard, teaches a drop-in seat spring unit assembly, referenced in use with the assembly of furniture, and including a top grid spaced from a bottom grid having conical springs positioned therebetween. The conical springs are snap-fit for attachment to the top grid and/or bottom grid without the requirement of mechanical fasteners or tools for attachment. A pair of opposed detents are formed in the top and/or bottom turns of the spring and/or the detents formed in the grid wires on the top and/or bottom grids and snap-fit engage with depressions formed in the grid wires to form the spring unit assembly.

SUMMARY OF THE PRESENT INVENTION

The present invention is a recoil strap for use with a vehicle seat bottom frame for providing resistive and biasing support. The strap design of the present invention is also an improvement over prior art wire grid and coil spring designs in both ease of manufacture and installation. Furthermore, the strap design is constructed so that a plurality of substantially identically constructed straps may be installed in side-by-side fashion to accommodate vehicle seats of different dimension.

The seat bottom frame is typically four-sided and is defined by an open interior with inwardly facing side edges. A plurality of apertured portions are defined along a first side edge of the frame and a further plurality of clasp portions are likewise defined along a second and opposite side edge.

The strap is constructed as an elongated and substantially planar shaped body, constructed of a stamped and spring steel blank, and including a first end and a second end. In the preferred embodiment, a plurality of catch portions extend from the first end of the strap for securing to the apertured portions of the frame bottom. A plurality of eyelet portions extend from the second end of the strap for securing to the clasp portions of the frame bottom and to engage the spring biasing strap in place.

Biasing of the strap in an upward direction, and in response to a downward application of force, is accomplished by forming into the stamped blank at least one plurality of alternating bends and recesses. In an alternate preferred variant, first and second individual pluralities of bends and recesses are formed at first and second cross wise extending locations of the stamped blank. Additional biasing of the strap is provided by the formation of an arcuate curvature within the blank and still yet additional biasing may be accomplished by forming a plurality of apertures within the stamped body and at selected locations.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective view of the recoil strap device for use with a vehicle seat frame and according to a first preferred variant of the present invention;

FIG. 2 is a top plan view of first and second strap devices illustrated in side-by-side mounted fashion and extending across the opening of the frame bottom according to the present invention;

FIG. 3 is a first cutaway view taken along line 3—3 of FIG. 2 and illustrating a first interengagement between an eyelet portion located at a selected end of the biasing strap device and which secures to an associated clasp portion defined along the associated side of the seat frame;

FIG. 4 is a second cutaway view taken along line 4—4 of FIG. 2 and illustrating a second interengagement between a catch portion located at a further selected end of the biasing strap device and which secures to an associated apertured portion defined along the associated side of the seat frame;

DETAILED DESCRIPTION OF THE PREFERRED EMBODIMENTS

Figure 5:
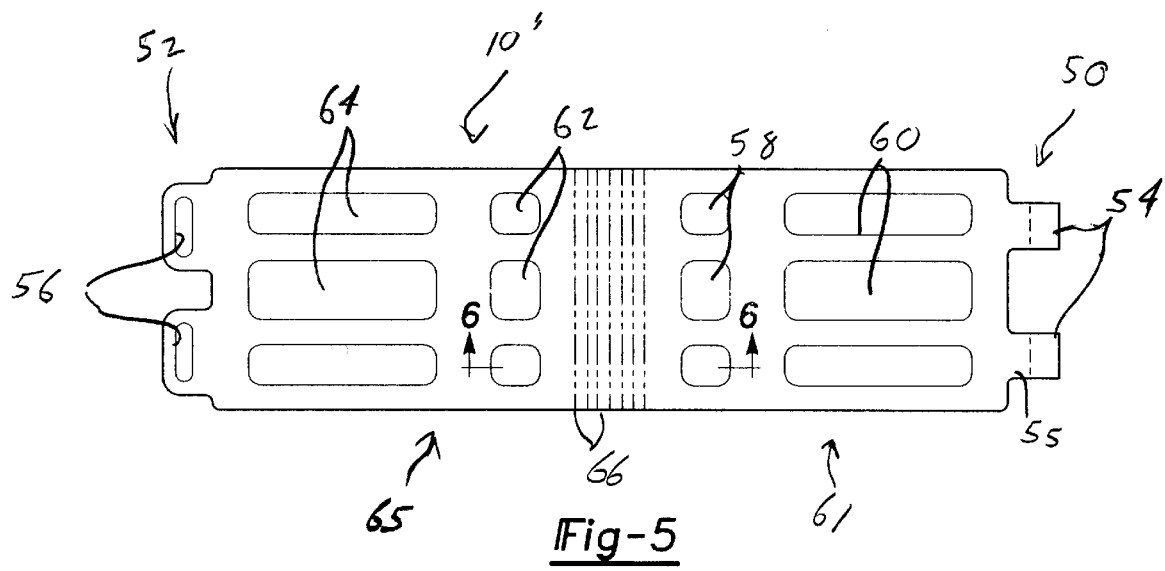
FIG. 5 is a top plan view of the recoil strap device for use with a vehicle seat frame and according to a second preferred variant of the present invention.

Referring now to FIG. 1, a spring-biased recoil strap is illustrated at 10 according to a first preferred variant of the present invention. As previously discussed, the strap design of the present invention is also an improvement over prior art wire grid and coil spring designs in both ease of manufacture and installation. Furthermore, the strap design is again constructed so that a plurality of substantially identically constructed straps may be installed in side-by-side fashion to accommodate vehicle seats of different dimension.

In the preferred manner of construction, the strap 10 is initially provided as a substantially flattened blank with an elongated and planar shaped body. This is most clearly illustrated in the general view at 12 in FIG. 7 and prior to an appropriate stamping operation which is performed on the blank and which will be subsequently described in more detail. It is further contemplated that, in one preferred application, the pre-stamped blank is provided as a 1050 spring steel material, however it is also contemplated that other alloys and even other types of materials can be employed in constructing the strap 10 provided they possess the necessary characteristics of resiliency and durability.

Referring again to FIG. 1, the elongated and planar shaped strap 10 includes a first end 14 and a second end 16. A plurality of catch portions 18 are extended by interconnecting neck portions 19 from the first end 14 of the strap, with each of the catch portions 18 including curved and hook-end portions defined at selected cross wise extending locations along the first end 14. Referring to the pre-stamped shape of the blank 12 in FIG. 7, the extending necks 19 are again shown in original form and it is envisioned that, with the appropriate stamping or forming operation, the desired hook curvature of the catch portions 18 is imparted into the completed strap. A plurality of eyelet portions 20 extend from the second end 16, with each of the eyelet portions 20 including an internally recessed and substantially "slot shaped" edge defined within selected cross wise extending locations along the second end 16.

Figure 7:
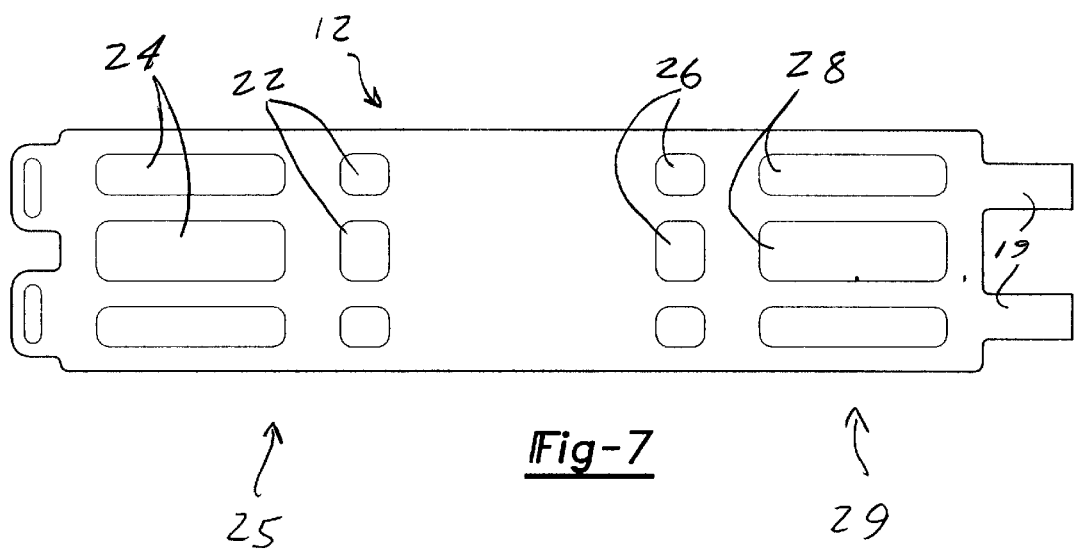
FIG. 7 is top plan view of a recoil strap in the form of a pre-stamped blank and according to both the first and second preferred variants of the present invention.

Pluralities of apertures are defined within the planar shaped body at selected locations and, referring both to the completed strap of FIG. 1 and the pre-stamped blank of FIG. 7, include first 22 and second 24 pluralities of apertures associated with a first extending half 25 of the elongated strap, as well as first 26 and second 28 additional pluralities of apertures associated with a second extending half 29 of the strap 10. The apertures 22, 24, 26 and 28 are each defined in the preferred variants with substantially rectangular and inwardly facing edges and according to a desired spacing and configuration. As will be subsequently described in additional detail, the provision and arrangement of the apertures 22, 24, 26 and 28 (beyond resulting in material savings to the blank 10) contributes additional spring biasing support in use. It is further contemplated that the provision and arrangement of the internal apertures 22, 24, 26, 28 can be modified to any extent desired without departing from the scope of the present invention.

Spring biasing of the strap, when installed upon the seat frame as will be shortly described, is provided by a variety of interchangeable or combinable features. The biasing features are again, in the preferred variants, introduced during the step of stamping the strap blank (see again FIG. 7 at 12). In one application, an arcuate curvature is formed in the stamped blank, and as is clearly evident in the view 10 of the strap of FIG. 1. The curvature of the stamped blank provides a pre-biasing or pre-stressing in an upwardly directed manner and responsive to a downwardly directed force existing when applied onto the seat frame bottom.

An additional or alternative manner of biasing the strap 10 is provided by the formation of at least one plurality of alternating bends and recesses formed across the width of the strap 10 and along selected axially extending locations of the strap. In the variant illustrated in FIG. 1, a first plurality 30 of bend and recessed portions are defined along the first extending half 25 of the strap 10 and a second plurality 32 of likewise bend and recessed portions are defined along the second extending half 29 of the strap. The alternating bend and recessed portions 30 and 32 of the strap 10 are preferably formed during the stamping operation, however it is again understood that other manufacturing processes (automated or manual) can be employed to both bend the strap to its arcuated configuration, as well as to impart the undulating or accordion-like effect of the alternating bends and recesses, and such processes may include heating the initial blank or even casting the blank from a molten state. It is also envisioned that the bends/recesses 30 and 32 can be provided according to any number and at any location within the scope of the invention.

Referring now to FIG. 2, a top plan view is illustrated of an application of first 10 and second 10' straps in side-by-side extending fashion across a seat frame bottom 34. As previously explained, any plurality of spring biasing straps 10, 10', etc., can be employed in a given seat application and is dictated largely by the size of the seat frame bottom. In one application, such as is illustrated in FIG. 2, the pair 10 and 10' of straps is often found sufficient for covering such as a single seat frame. In a further application, such as where an elongated bench seat is provided, it may be desirable to engage upwards of several straps in side-by-side fashion along the bottom of the seat frame. Although not shown in the drawings, it is envisioned that a suitable seat bottom cushion is applied over the seat frame bottom 34 and to complete the vehicle seat installation.

The seat frame 34 typically includes first 36 and second 38 spaced apart sides with inwardly facing side edges and which are interconnected by third 40 and fourth 42 additional such sides to define an enclosed frame with a central and open area 44 extending therebetween. The seat frame 34 also includes apertured portions 46 defined at selected locations along the inwardly facing edge of the first side 36 and which are in alignment with and are engaged by the catch portions 18 extending from the first end 14 of strap 10. Reference is made to FIG. 4, which illustrates in cross sectional cutaway this interengagament, and with reference to the strap member 10'. It should be understood that the strap members 10 and 10' are substantially identically constructed; accordingly a repetitive identification of each element in the second strap member 10' (or any additional strap members employed in a multiple arrangement such as is illustrated in FIG. 2) is unnecessary. Owing to the identical construction of the strap 10', corresponding reference numerals attributed also to the strap 10 are repeated herein and for ease of explanation.

Referring further to FIG. 3, an interengagement is illustrated in cross sectional cutaway between the eyelet portions 20 extending from the second end 16 of the strap and clasp portions 48 arranged at the corresponding second side 38 of the seat frame 34. The clasp portions 48 are configured so that, during installation of the strap 10 and 10', the eyelet portions 20 of the straps are engaged by the clasp portions 48 and, subsequently, the opposite end of the straps are bent downwardly and manipulated so that the catch portions 18 engage through the apertured portions 46 of the seat frame. It is further understood and envisioned that the number and configuration of the catch portions 18 and eyelet portions 20 of the straps can be modified within the scope of the present invention and further in view of variations which may be encountered in the interengaging structure of the seat frame bottom.

Referring now to FIG. 5, a recoil strap 10" is illustrated according to a further preferred variant. Similarly to the strap 10 illustrated in FIG. 1, the strap 10" may also be initially provided as the blank 12 illustrated in FIG. 7 and prior to the appropriate stamping operation being employed. The elongated and planar shaped strap 10" includes a first end 50 and a second end 52. As with the corresponding variant of FIG. 1, a plurality of catch portions 54 are extended by interconnecting neck portions 55 from the first end 50 of the strap, with each of the catch portions 54 including curved and hook-end portions defined at selected cross wise extending locations along the first end 50. A plurality of eyelet portions 56 extend from the second end 52, with each of the eyelet portions 56 including an internally recessed and substantially "slot shaped" edge defined within selected cross wise extending locations along the second end 52.

Pluralities of apertures are defined within the planar shaped body at selected locations and include first 58 and second 60 pluralities of apertures associated with a first extending half 61 of the elongated strap, as well as first 62 and second 64 additional pluralities of apertures associated with a second extending half 65 of the strap 10". The apertures 58, 60, 62 and 64 are each defined in the preferred variants with substantially rectangular and inwardly facing edges and according to a desired spacing and configuration. As with the description of the pluralities of apertures 22, 24, 26 and 28 explained in relation to the strap 10 of the variant of FIG. 1, the provision and arrangement of the apertures may be modified as desired by one skilled in the art and without departing from the scope of the invention.

Figure 6:
FIG. 6 is a cutaway side view, taken along line 6—6 in FIG. 5, of the recoil strap device according to the further preferred variant.

Referring again to FIG. 5, and also to the side cutaway view of FIG. 6, a plurality of alternating bends and recesses 66 are defined in cross wise extending fashion and at a substantially centralized location of the strap 10". Contrasting to the variant of FIG. 1, the single plurality of bends and recesses 66 of the strap 10" substitutes the first 30 and second 32 pluralities of bends and recesses of the strap 10.

Furthermore, the bend/recessed arrangement 66 of FIG. 5 does not coincide in placement with the respective pluralities 58 and 62 of the internally formed apertures. As previously discussed, the number and placement of the bends and recesses, in combination with the corresponding configuration and arrangement of the internally formed apertures, combine to adjust a level of spring biasing to the strap. The strap 10" according to the further preferred variant further is not arcuately shaped, such as is illustrated in reference to the strap 10 of FIG. 1, and it is further envisioned to be within the parameters of one skilled in the art to determine to what extent, and if at all, to bend the strap into a desired arcuate shape in combination, or again alternative to, imparting the desired number of bends and recesses into the formed strap and prior to its application onto the seat frame bottom.

It is apparent therefore that the present application teaches a novel and useful recoil strap for biasing a seat frame bottom of a vehicle. Additional preferred embodiments will become apparent to those skilled in the art to which it pertains and without deviating from the scope of the appended claims.

I claim:

1. A recoil strap for use with a vehicle seat frame bottom having an open interior defined by inwardly facing side edges, said strap further comprising:

an elongated and substantially planar shaped body having a first end and a second end and exhibiting an arcuate extending curvature substantially along its length;

first engaging means at said first end and for securing to a first associated side of the frame bottom;

second engaging means at said second end and for securing a second associated side of the frame bottom; and said extending and arcuate curvature providing for pre-biasing of said elongated body in an upward direction and in response to a downward application of force.

2. The recoil strap as described in claim 1, said strap further comprising a stamped and spring steel blank.

3. The recoil strap as described in claim 2, further comprising at least one plurality of alternating bends and recesses formed in said stamped blank.

4. The recoil strap as described in claim 1, further comprising a plurality of apertures defined in said planar shaped body at selected locations.

5. The recoil strap as described in claim 1, said first engaging means further comprising a plurality of catch portions.

6. The recoil strap as described in claim 1, said second engaging means further comprising a plurality of eyelet portions.

7. The recoil strap as described in claim 1, further comprising a plurality of identically constructed straps secured in side-by-side extending fashion within the vehicle seat frame bottom.

8. A recoil strap for use with a vehicle seat frame bottom, the frame having an open interior defined by inwardly facing side edges, apertured portions being defined along a first side edge of the frame and clasp portions being defined along a second side edge, said strap further comprising:

an elongated and substantially planar shaped body constructed of a stamped and spring steel blank, said body having a first end and a second end;

a plurality of catch portions extending from said first end for securing to the aperture portions of the frame bottom;

a plurality of eyelet portions extending from said second end for securing to the clasp portions of the frame bottom; and biasing means for spring biasing said strap in an upward direction and in response to a downward application of force, said biasing means further including at least one plurality of alternating bends and recesses formed in said stamped blank.

9. A recoil strap for use with a vehicle seat frame bottom, the frame having an open interior defined by inwardly facing side edges, apertured portions being defined along a first side edge of the frame and clasp portions being defined along a second side edge, said strap further comprising:

an elongated and substantially planar shaped body constructed of a stamped and spring steel blank, said body having a first end and a second end;

a plurality of catch portions extending from said first end for securing to the aperture portions of the frame bottom;

a plurality of eyelet portions extending from said second end for securing to the clasp portions of the frame bottom; and biasing means for spring biasing said strap in an upward direction and in response to a downward application of force, said biasing means further including an arcuate curvature formed in said stamped blank.

* * * * *